Sept. 8, 1964
S. STEINBERG
3,147,718
GARDEN TOOL
Filed April 4, 1961
2 Sheets-Sheet 1
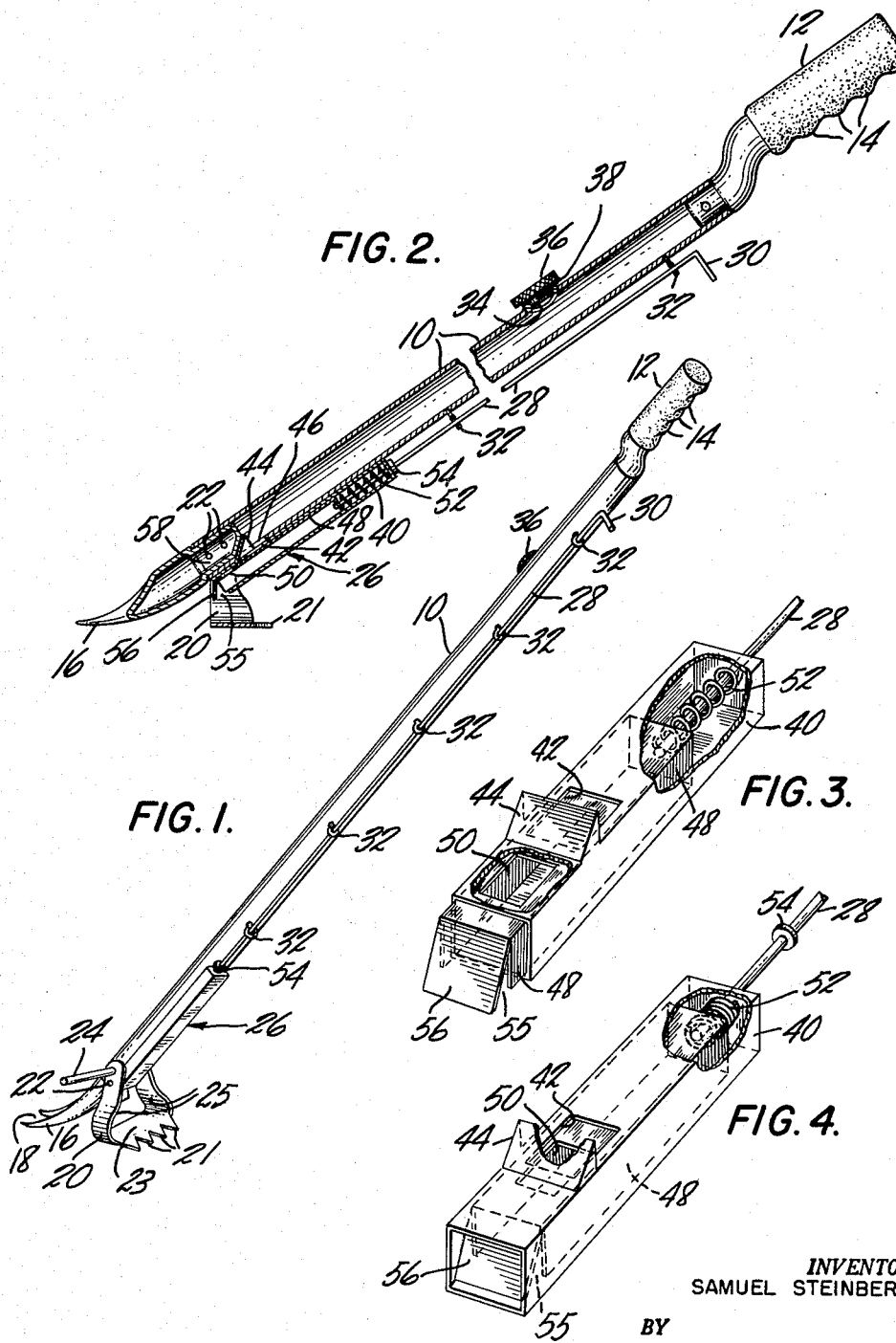
INVENTOR.
SAMUEL STEINBERG
BY
Eyre, Mann & Lucas
ATTORNEYS Sept. 8, 1964  S. STEINBERG  3,147,718
GARDEN TOOL
Filed April 4, 1961  2 Sheets-Sheet 2
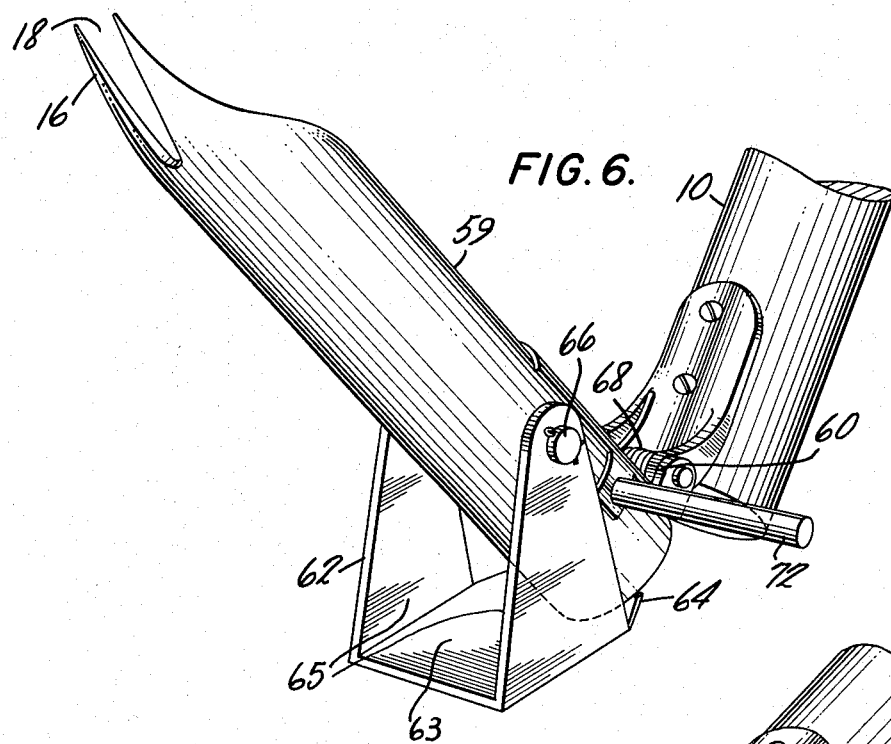
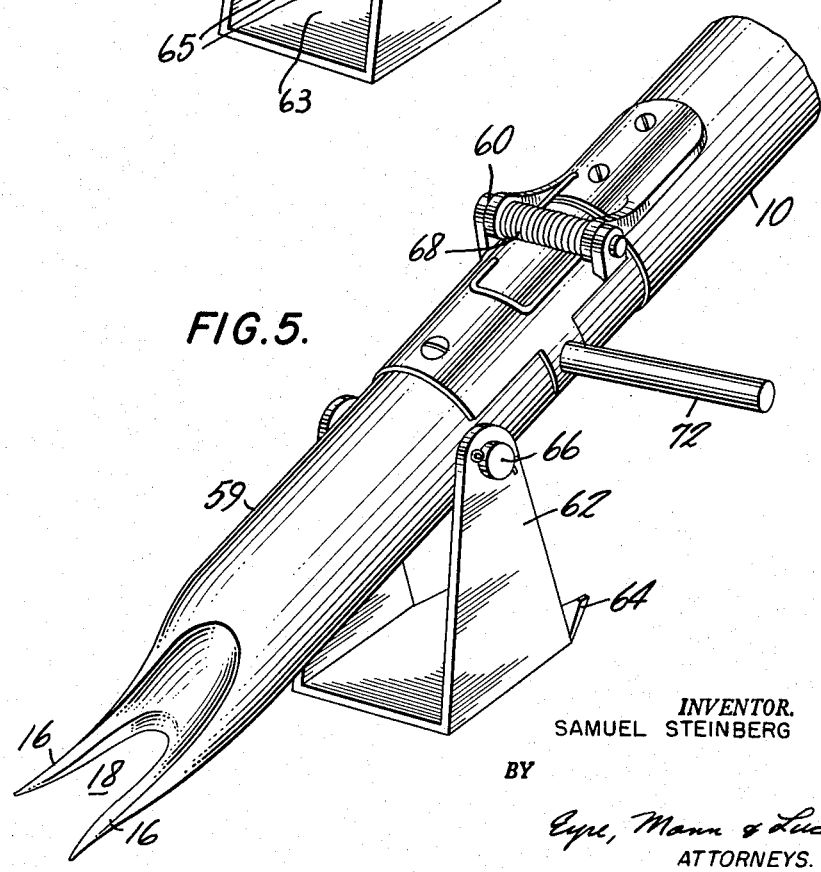
INVENTOR.
SAMUEL STEINBERG
BY
*Eyre, Mann & Lucas*
ATTORNEYS.

United States Patent Office 3,147,718
Patented Sept. 8, 1964

3,147,718
GARDEN TOOL
Samuel Steinberg, 451 Woodbridge Road,
Rockville Centre, N.Y.
Filed Apr. 4, 1961, Ser. No. 100,689
6 Claims. (Cl. 111—95)

This invention relates to a garden tool which is particularly useful in dressing up lawns, gardens and other cultivated areas. More specifically the tool permits the user to uproot weeds and then drop a measured quantity of seed or other particulate material desirable for plant growth into and around the area of the resulting cavities, all from a standing position.

The great advantage of my tool is that all of the operations incident to dressing up a lawn, that is, removing weeds from patch areas and, for example, seeding the areas with grass seed, may be carried out at one time. Thus, with a minimum amount of equipment and time, the user can dress up any desired area and finish the work without having to make frequent trips to some other place for separate tools and materials. Furthermore, since all of the operations may be carried out from a standing position, the tool gives a substantial benefit in reducing the effort expended and fatigue experienced by the user.

Briefly described, my tool comprises a member serving as the stem or main body of the tool having a notched fork at one end thereof. Positioned near the fork at an acute angle thereto is a stirrup which serves as a fulcrum in the uprooting action. Thus, it is by positive lever action that the tool effectively uproots weeds of various type, including those having deep and shallow roots. The tool also provides a storage area for seed or other particulate material which is dispensed on the ground in measured quantities by means of a seed ejector mechanism for which an operative trigger is located near the handle of the tool where it may be readily actuated. In a modified form the tool is provided with a separate movable fork which, acting through a hinge and a spring, gives a substantially greater uprooting action.

Further details of my invention will be readily understood by reference to the accompanying drawings which illustrate preferred embodiments thereof and in which:

FIG. 1 is a three quarter perspective view of one form of tool.

FIG. 2 is a sectional view taken along the longitudinal axis of the tool of FIG. 1.

FIG. 3 is a perspective view on an enlarged scale of a seed ejector mechanism in one operative position.

FIG. 4 is a view similar to that of FIG. 3 showing the mechanism in another operative position.

FIG. 5 is a perspective view of a modified form of fork in one operative position.

FIG. 6 is a view similar to that of FIG. 5 showing the fork in another position.

As shown in FIGS. 1 and 2 the tool of my invention includes a hollow tube 10 which is made of aluminum. At one end of the tube 10 a handle 12, made of rubber or other resilient friction material and having finger concavities 14, is frictionally engaged over the tube to provide a gripping element for the user. The opposite end of the tube bears a fork 16 having a V-shaped notch 18. The fork 16 may be an integral part of the tube 10 as illustrated or it may be a separate element which is attached to the tube as by friction fit, welding or with bolts.

Positioned near the fork 16 is a stirrup 20 which is attached to tube by means of bolts 22. The stirrup 20 is comprised of a horizontal floor 23 having two spaced side edges and a front and back edge, and two vertical arms or legs 25 which extend upwardly from the side edges of the horizontal floor 23. The stirrup 20 is maintained in a fixed position in which the arms thereof are at an acute angle with respect to the longitudinal axis of the tool taken from the point of attachment of the stirrup arms 25 at bolts 22 down toward the fork. In the structure shown this angle is approximately 50° which I have found gives excellent results. As shown in FIG. 1 the back edge of the horizontal floor of the stirrup 20 is pronged to provide a series of rake teeth 21. Extending out from one side of the tube, on a line normal to the longitudinal axis of the tube, is a foot bar 24 which is attached to the tube in fixed position. Looking down the tube from the handle 12, this foot bar extends out from the left side of the tube. This particular position is usually most convenient for right-handed persons. However, the foot bar may also be positioned on the opposite right side of the tube for the convenience of left-handed persons.

Positioned along the bottom side of the tube 10 is a seed ejector mechanism generally designated 26. This mechanism is operated by means of the pull rod 28 which extends up to the handle 12 where it is bent at a right angle to form the trigger 30. The pull rod is maintained in spaced relationship to the bottom side of the tube 10 by means of the eyelets 32. The tube 10 is filled with seed or other particulate material through the opening 34 located in the top side thereof. The opening 34 is closed off with the plug 36 which preferably carries a gasket 38 to seal the opening against entry of moisture.

The seed ejector mechanism is best illustrated in FIGS. 2, 3 and 4. As there shown the mechanism includes an outer housing 40 which has a top opening 42. An angled chute is positioned in front of the opening 42 for the purpose of guiding seed down into the opening. The housing 40 is attached to the bottom side of the tube 10 which has an opening 46 for receiving the chute 44. When the housing 40 is in place against the bottom side of the tube 10, the openings 42 and 46 register with each other and provide a passageway for the seed contained in the tube. The ejector mechanism includes a movable chamber 48 which is positioned within the housing 40. The top wall of the chamber has an opening 50 which is of generally the same size as the opening 42. The back wall of the chamber 48 is attached to the pull rod 28 which extends into the housing 40 through an opening in the back wall thereof. A coil spring 52 is positioned between the back walls of the chamber 48 and the housing 40 and the spring normally urges the chamber into the position shown in FIG. 2. A washer 54 positioned on the pull rod 28 outside of the housing 40 prevents the spring 52 from forcing the movable chamber 48 completely out of the housing 40.

In the normal position of the ejector mechanism shown in FIG. 3, the openings 42 and 50 are out of register so that seed from the tube 10 cannot enter the chamber 48. When the trigger 30 is pulled upwardly the pull rod 28 moves the chamber 48 back into position shown in FIG. 4, thereby registering the openings 42 and 50 with each other and compressing the spring 52. Seed now fills the chamber under gravity flow and when the trigger 30 is released and the chamber thereby caused to return to the position of FIG. 3 by the expansion of the spring 52, the seed falls out of the front opening 55 onto the ground. The slanted front wall 56 of the chamber aids in deflecting the seed down to the desired area of the ground. The dimensions of the front wall 56 are, of course, such that the chamber 48 is closed off in the position shown in FIG. 4 so that seed can not fall to the ground until the trigger 30 is released. As shown in FIG. 2 the tube has a solid plug 58 just below the chute 44 so that the seed is contained in the tube from in and around the chute up to the opening 34.

Use of the tool now described in one of its preferred embodiments is a very simple operation. After the tube 10 has been filled with seed or other desired material, the fork at the end of the tool is inserted into the ground adjacent a weed either at an angle or vertically, depending on the hardness of the ground. In either case the bar 24 may be pressed upon with the foot to assist penetration of the ground. After the fork has been inserted into the desired area, the handle 12 is lowered and this will bring the horizontal floor of the stirrup into engagement with the ground if it is not already so engaged. The tool now acts as a lever with the stirrup functioning as the fulcrum and continued lowering of the handle will cause the fork to uproot the weed with which its V-shaped notch is engaged. Thereafter, the rake teeth 21 of the stirrup can be conveniently used to rake the uprooted weed away from the resulting cavity in the ground. A pull and release of the trigger 30 dispenses fresh seed into and around the cavity and the work of dressing up a particular spot has been accomplished without once having to move from a standing position.

FIGS. 5 and 6 illustrate a modified form of lower portion of the tool. In this embodiment of the invention the fork 59 is a separate member which is attached to the body of the tube by a hinge 60 located on the top walls of the fork and the tube. A stirrup 62 having a structure similar to that of stirrup 20 such as the horizontal floor 63, vertical arms 65 and a series rake teeth 64 along the back edge of its horizontal floor is attached to the fork with a bolt 66. The stirrup 62 is free to pivot around the bolt 66 and is not maintained at a fixed angle with respect to the fork as in the embodiment shown in FIGS. 1 and 2. The fork 59 is normally maintained in axial alignment with the body of the tube 10 by a coil spring 68 which is attached to the exterior walls of the two members by means of pins 70. A foot rod 72 extending out on a line normal to the longitudinal axis of the fork 59 is positioned below the spring 68 in the side wall of the fork.

In using this modified form of tool the fork 59 is inserted into the ground adjacent a weed in the manner described for the tool shown in FIGS. 1 and 2. Since the force of penetration is applied along a line parallel to the longitudinal axis of the tool, there is no tendency for the fork to separate from the tube at the hinge 60. After penetration, the floor of the stirrup 62 is engaged with the ground if it is not already so engaged by lowering the handle of the tool. The stirrup, being freely pivotable around the bolt 66, readily engages the ground through its horizontal floor whether the tool is inserted vertically or at an angle. The user now places his foot upon the rod 72 and presses the rod downwardly in a substantially vertical direction. As shown in FIG. 6 the force applied to the rod overcomes the force of the spring holding the fork and tube together with the result that the fork separates from the tube through the hinge, simultaneously pivoting around the bolt 66 and uprooting the weed with which its V-shaped notch is engaged. Thereafter, when the foot is removed from the rod 72, the spring 68 causes the fork and tube to return together in axial alignment as shown in FIG. 5.

As can be seen from the drawings, the upward travel of the pivotable fork in the modified form of structure takes place through a very large angle, in fact approaching a rotation of 180°. This results in an extremely powerful uprooting action which may be used to great advantage in removing tough deep-rooted weeds, especially those having a long central tap root. If desired the upward travel of the fork can be limited by providing a stop comprising a plate or bar of rigid material attached to the bottom side of the fork and extending up below the bottom side of the tube a predetermined distance. When the fork separates from the tube, the stop will travel downwardly with the fork until it strikes the ground at which time further rotation and upward travel of the fork will be prevented.

As to materials of construction I prefer to use a strong lightweight metal such as aluminum, magnesium, or alloys thereof so that the tool will not be objectionably heavy. However, other metals or rigid plastic materials may also be employed. The angle between the fork and stirrup in the embodiment of FIGS. 1 and 2 is preferably about 50° but larger or smaller acute angles may be used as desired. In the modified form of structure shown in FIGS. 5 and 6 a form of spring other than the coil spring 68 may be employed for holding the fork and tube in axial alignment. In this connection I also have in mind certain hinges which have a built in spring for the purpose of urging the two arms thereof into a normally straight line position with respect to each other. Such hinges which are commercially available on the open market, eliminate the need for a separate spring when used in place of the ordinary hinge 60 shown in the drawings. While all of the embodiments I have described include the seed ejector mechanism, this is not actually necessary as a tool built without the ejector mechanism, and particularly one having the modification of FIGS. 5 and 6, can be used to advantage in uprooting and raking away weeds or other objectionable growths.

It will be understood that it is intended to cover all changes and modifications of the preferred embodiment of the invention herein chosen for the purpose of illustration which do not depart from the spirit and scope of the invention.

I claim:

1. A hand manipulated planting tool which comprises an elongated hollow tube having a fork at one end thereof, a stirrup pivotally attached to said tube near said fork, said stirrup having a horizontal floor and two vertical arms extending upwardly from the side portions of said floor to the pivoting axis, said stirrup being freely pivotable around said pivoting axis and hanging pendulously beneath said hollow tube to maintain the floor of the stirrup in a horizontal position regardless of the angle of disposition of said hollow tube, a rod attached to one side wall of said tube, said rod extending out from said tube on a line normal to the longitudinal axis of said tube, a first opening positioned in the side wall of said tube near said stirrup, a second opening positioned in the side wall of said tube above said first opening, removable plug means closing said second opening, ejector means positioned adjacent said first opening and communicating therethrough with the interior of said tube for dispensing particulate material therefrom and means for actuating said ejector means.

2. A tool in accordance with claim 1 in which the ejector means and actuating means therefor comprise an outer housing having an opening in the top wall thereof, said housing being positioned against the wall of said tube to register the opening therein with the said first opening in said tube, a chamber positioned in said outer housing and slidable therein, said chamber having a first opening in the top wall thereof and having a second opening in the front wall thereof, spring means maintaining said chamber in a position where the said first opening therein is out of register with said opening in the outer housing, a rod connected to said chamber and extending up to the handle of said tool, the end of said rod being bent to form an actuating trigger.

3. A hand manipulated planting tool which comprises an elongated tubular member, a fork hingedly connected to one end of said tubular member, spring means for maintaining said tubular member and said fork in longitudinal axial alignment, a stirrup pivotally attached to said fork, said stirrup having a horizontal floor and two vertical arms extending upwardly from the side portions of said floor to the pivoting axis, said stirrup being freely pivotable around said pivoting axis and hanging pendulously beneath said tubular member to maintain the floor of the stirrup in a horizontal position regardless of the angle of disposition of said tubular member, and a rod attached to one side wall of said fork and extending out therefrom on a line normal to the longitudinal axis of said fork.

4. A tool in accordance with claim 3 in which the back edge of the floor of said stirrup is pronged in the form of rake teeth.

5. A hand manipulated planting tool which comprises an elongated hollow tube having closed ends, one end having a handle made of resilient friction material and the other end being connected to a fork through a hinge, a first opening in said tube near said handle and a second opening near the opposite end of said tube, removable plug means closing said first opening, spring means for maintaining said tube and said fork in longitudinal axial alignment, a stirrup pivotably attached to said fork, said stirrup having a horizontal floor and two vertical arms extending upwardly from the side portions of said floor to the pivoting axis, said stirrup being freely pivotable around said pivoting axis and hanging pendulously beneath said hollow tube to maintain the floor of the stirrup in a horizontal position regardless of the angle of disposition of said hollow tube, a rod attached to one side wall of said fork and extending out therefrom on a line normal to the longitudinal axis of said fork, a housing having an opening in the top wall thereof, said housing being positioned against the exterior wall of said tube to register the opening therein with said second opening in said tube, a chamber positioned in said housing and slidable therein, said chamber having a first opening in the top wall thereof and having a second opening in the front wall thereof, spring means maintaining said chamber in a position where the said first opening therein is out of register with said opening in said housing, a rod connected to said chamber and extending up to about the handle of the tool, the end of said rod being bent to form a trigger.

6. A tool in accordance with claim 5 which includes a chute positioned adjacent the opening in the top wall of said housing, said chute having one wall positioned at an acute angle with respect to a flat plane extending through said opening.

References Cited in the file of this patent

UNITED STATES PATENTS

| | | |
|---|---|---|
| 60,483 | Crum | Dec. 18, 1866 |
| 488,596 | Ayers | Dec. 27, 1892 |
| 529,562 | Mortenson | Nov. 20, 1894 |
| 556,134 | Choate | Mar. 10, 1896 |
| 637,091 | Cutter | Nov. 14, 1899 |
| 947,906 | Hall | Feb. 1, 1910 |
| 1,036,283 | Lindsey | Aug. 20, 1912 |
| 1,573,222 | Coelho | Feb. 16, 1926 |
| 1,848,651 | Peeler | Mar. 8, 1932 |
| 2,029,833 | Pirich | Feb. 4, 1936 |
| 2,716,538 | Arrowhead | Aug. 30, 1955 |
| 2,734,468 | Jones | Feb. 14, 1956 |
| 2,860,586 | Nozell | Nov. 18, 1958 |

FOREIGN PATENTS

| | | |
|---|---|---|
| 30,635 | France | Apr. 20, 1926 |
| 867,733 | France | Sept. 1, 1941 |
| 50,484 | Norway | Apr. 4, 1932 |
| 15,123 | Sweden | Apr. 28, 1902 |